(12) United States Patent
Ristoski et al.

(10) Patent No.: US 11,030,402 B2
(45) Date of Patent: Jun. 8, 2021

(54) DICTIONARY EXPANSION USING NEURAL LANGUAGE MODELS

(71) Applicant: International Business Machines Corporation, Armonk, NY (US)

(72) Inventors: Petar Ristoski, San Jose, CA (US); Daniel Gruhl, San Jose, CA (US); Alfredo Alba, Morgan Hill, CA (US); Anna Lisa Gentile, San Jose, CA (US); Ismini Lourentzou, Urbana, IL (US); Chad Eric DeLuca, Morgan Hill, CA (US); Linda Ha Kato, San Jose, CA (US); Steven R. Welch, Gilroy, CA (US); Chris Kau, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 16/403,232

(22) Filed: May 3, 2019

(65) Prior Publication Data

US 2020/0349226 A1 Nov. 5, 2020

(51) Int. Cl.
*G06F 40/242* (2020.01)
*G06N 3/08* (2006.01)
*G06F 40/30* (2020.01)

(52) U.S. Cl.
CPC .......... *G06F 40/242* (2020.01); *G06F 40/30* (2020.01); *G06N 3/08* (2013.01)

(58) Field of Classification Search
CPC ......... G06F 40/242; G06F 40/30; G06N 3/08; G10L 15/32; G10L 15/08; G10L 2015/227; G10L 2015/088; G10L 2015/223; G10L 15/22; H04R 1/34; H04R 1/40; H04R 1/32; H04R 2430/01; H04R 3/02; H04R 3/12; H04R 29/007; H04R 27/00; H04R 2227/005

See application file for complete search history.

(56) References Cited

U.S. PATENT DOCUMENTS

| 2005/0108630 A1 | 5/2005 | Wasson et al. |
| 2010/0174528 A1 | 7/2010 | Oya et al. |
| 2012/0158703 A1 | 6/2012 | Li et al. |

(Continued)

OTHER PUBLICATIONS

Alba, A., et al., Multi-lingual Concept Extraction with Linked Data and Human-in-the-Loop, Proceeding of K-CAP 2017; Knowledge Capture Conference (K-CAP 2017), Dec. 2017.

(Continued)

*Primary Examiner* — Huyen X Vo

(74) *Attorney, Agent, or Firm* — Lieberman & Brandsdorfer, LLC

(57) ABSTRACT

Embodiments relate to a system, program product, and method for iterative expansion and application of a domain-specific dictionary. One or more dictionary instances are applied against a text corpus. The dictionary is iteratively expanded and selectively populated with one or more additional dictionary instances, including semantically similar instances to the applied dictionary instances and extension instances contextually related to the applied dictionary instances. The iteratively expanded dictionary is applied to an unexplored corpus to identify matching corpus data to populated instances of the dictionary.

17 Claims, 9 Drawing Sheets

(56) References Cited

U.S. PATENT DOCUMENTS

| | | | |
|---|---|---|---|
| 2015/0095017 A1 | 4/2015 | Mnih et al. | |
| 2017/0060845 A1* | 3/2017 | Allen | G06F 40/268 |
| 2017/0185581 A1* | 6/2017 | Bojja | G06K 9/6269 |
| 2017/0220584 A1 | 8/2017 | Gruhl et al. | |
| 2018/0143970 A1* | 5/2018 | Skarbovsky | G10L 15/26 |
| 2018/0173696 A1* | 6/2018 | Hosabettu | G06F 16/36 |
| 2018/0173698 A1* | 6/2018 | Dubey | G06F 40/30 |
| 2018/0197530 A1* | 7/2018 | Baughman | G06F 40/205 |
| 2020/0142856 A1* | 5/2020 | Neelamana | G06N 20/00 |

OTHER PUBLICATIONS

Ando, Rie Kubota, Semantic Lexicon Constructions: Learning from Unlabeled Data via Spectral Analysis, IBM Thomas J. Watson Research Center, Yorktown Heights, NY, 2004.
Bengio, Yoshua, et cl., Learning Long-Term Dependencies with Gradient Descent is Difficult, IEEE Transactions on Neural Networks, vol. 5, No. 2, pp. 157-166, 1994.
Blohm, Sebastian, et al., Using the Web to Reduce Data Sparseness in Pattern-Based Information Extraction, PKDD 2007, pp. 18-29.
aLARKSON, Kenneth, et al., User-Centric Ontology Population, Springer Nature 2018, pp. 112-127, 2018.
Coden, Anni, et al., SPOT the drug! An unsupervised pattern matching method to extract drug names from very large clinical corpora, 2012 IEEE Second Conference on Healthcare Informatics, Imaging and Systems Biology, pp. 33-39, 2012.
Hamilton, William L., Inducing Domain-Specific Sentiment Lexicons from Unlabeled Corpora, Conference on Empirical Methods in Natural Language Processing, pp. 595-605, 2016.
Igo, Sean, P., Corpus-based Semantic Lexicon Induction with Web-based Corroboration, Proceedings of the NAACL HLT Workshop on Unsupervised and Minimally Supervised Learning of Lexical Semantics, pp. 18-26, 2009.
Lee, Kathy, et al., Adverse Drug Event Detection in Tweets with Semi-Supervised Convolutional Neural Networks, International World Wide Web Conference Committee, pp. 705-714, 2017.
Mikolov, Tomas, et al., Distributed Representations of Words and Phrases and their Compositionality, Advances in neural information processing systems, pp. 3111-3119, 2013.
Pazienza, Maria Teresa, Terminology Extraction: An Analysis of Linguistic and Statistical Approaches, Knowledge Mining, pp. 255-279, 2005.
Prollochs, Nicolas, et al., Generating Domain-Specific Dictionaries using Bayesian Learning, ECIS 2015 Proceedings.
Riloff, Ellen, et al., Learning Dictionaries for Information Extraction by Multi-Level Bootstrapping, American Association for Artificial Intelligence, pp. 474-479, 1999.
Riloff, Ellen, Learning Subjective Nouns using Extraction Pattern Bootstrapping, Proceeding of the 7th CoNLL Conference, pp. 25-32, 2003.
Hochreiter, Sepp, et al., Gradient Flow in Recurrent Nets: the Difficulty of Learning Long-Term Dependencies, 2001.
Kuriki, Ichiro, The modern Japanese color lexicon, Journal of Vision, 17(3), pp. 1-18, 2017.
Schuster, Mike, et al., Bidirectional Recurrent Neural Networks, IEEE Transactions on Signal Processing, vol. 45, No. 11, Nov. 1997, p. 2673-2681.
Mang Ziqi, et al., JATE 2.0: Java Automatic Term Extraction with Apache Solr, LREC pp. 2262-2269, 2016.
Zhang, Ziqi, et al., SemRe-Rank: Improving Automatic Term Extraction by Incorporating Semantic Relatedness With Personalised PageRank, TKDD 12(5), 57:1-5, 2017.
Bourigault, Didier, Surface Grammatical Analysis for the Extraction of Terminological Noun Phrases, Proceedings of the 1th Conference on Computational Linguistics, vol. 3, pp. 977-981, 1992.
Church, Kenneth W., Inverse Document Frequency (IDE): A Measure of Deviations from Poisson, pp. 283-295, 1999.
Coden, Anni, et al., A Method to Accelerate Human in the Loop Clustering, Proceedings of the 2017 SIAM International Conference on Data Mining, pp. 237-245, 2017.
Alhothali, Areej et al., Semi-Supervised Affective Meaning Lexicon Expansion Using Semantic and Distributed Word Representations, arXiv:1703.09825, Mar. 2017.
Biemann, Chris, et al., A Framework for Enriching Lexical Semantic Resources with Distributional Semantics, Natural Langauge Engineering 1 (1):000-000, 1998.
Chen, Bo, et al., Semi-Supervised Lexicon for Wide-Coverage Semantic Parsing, Proceedings of the 27th International Conference on Computational Linguistics, pp. 892-904, 2018.

\* cited by examiner

DICTIONARY EXPANSION USING NEURAL LANGUAGE MODELS

BACKGROUND

The present embodiments relate to cognitive process and information extraction. More specifically, the embodiments relate to iterative dictionary expansion directed at identification of semantic and contextual relationships.

SUMMARY

The embodiments include a system, computer program product, and method for iterative expansion of a domain-specific dictionary, and application of the expanded dictionary.

In one aspect, a system is provided with an artificial intelligence (AI) platform and one or more associated tools embedded therein for iterative expansion and application of a domain-specific dictionary. A processing unit is operatively coupled to memory and is in communication with the AI platform and the embedded tools, including a dictionary manager, a director, and a text manager. The dictionary manager functions to apply one or more dictionary instances against a text corpus. The director functions to iteratively expand the dictionary by selectively adding one or more additional instances to the dictionary. The director identifies one or more semantically similar instances to the applied dictionary instances and identifies one or more extension instances contextually related to the applied dictionary instances. The director then selectively adds the identified semantically similar and extension instances to the dictionary. The text manager functions to apply the iteratively expanded dictionary to an unexplored corpus to identify matching corpus data to populated instances of the dictionary.

In another aspect, a computer program device is provided for iterative expansion and application of a domain-specific dictionary. The program code is executable by a processing unit to apply one or more dictionary instances against a text corpus. The program code iteratively expands the dictionary by selectively adding one or more additional instances to the dictionary. The program code identifies one or more semantically similar instances to the applied dictionary instances and also identifies one or more extension instances that are contextually related to the applied dictionary instances. The identified semantically similar and extension instances are selectively added to the dictionary. Program code applies the iteratively expanded dictionary to an unexplored corpus to identify matching corpus data to populated instances of the dictionary.

In yet another aspect, a method is provided for iterative expansion and application of a domain-specific dictionary. One or more dictionary instances are applied against a text corpus. The dictionary is iteratively expanded by selectively adding one or more additional dictionary instances to the dictionary. One or more semantically similar instances to the applied dictionary instances are identified and one or more extension instances that contextually related to the applied dictionary instances are identified. The identified semantically similar and extension instances are selectively added to the dictionary. The iteratively expanded dictionary is applied to an unexplored corpus and matching corpus data to populated instances of the dictionary is identified and communicated.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
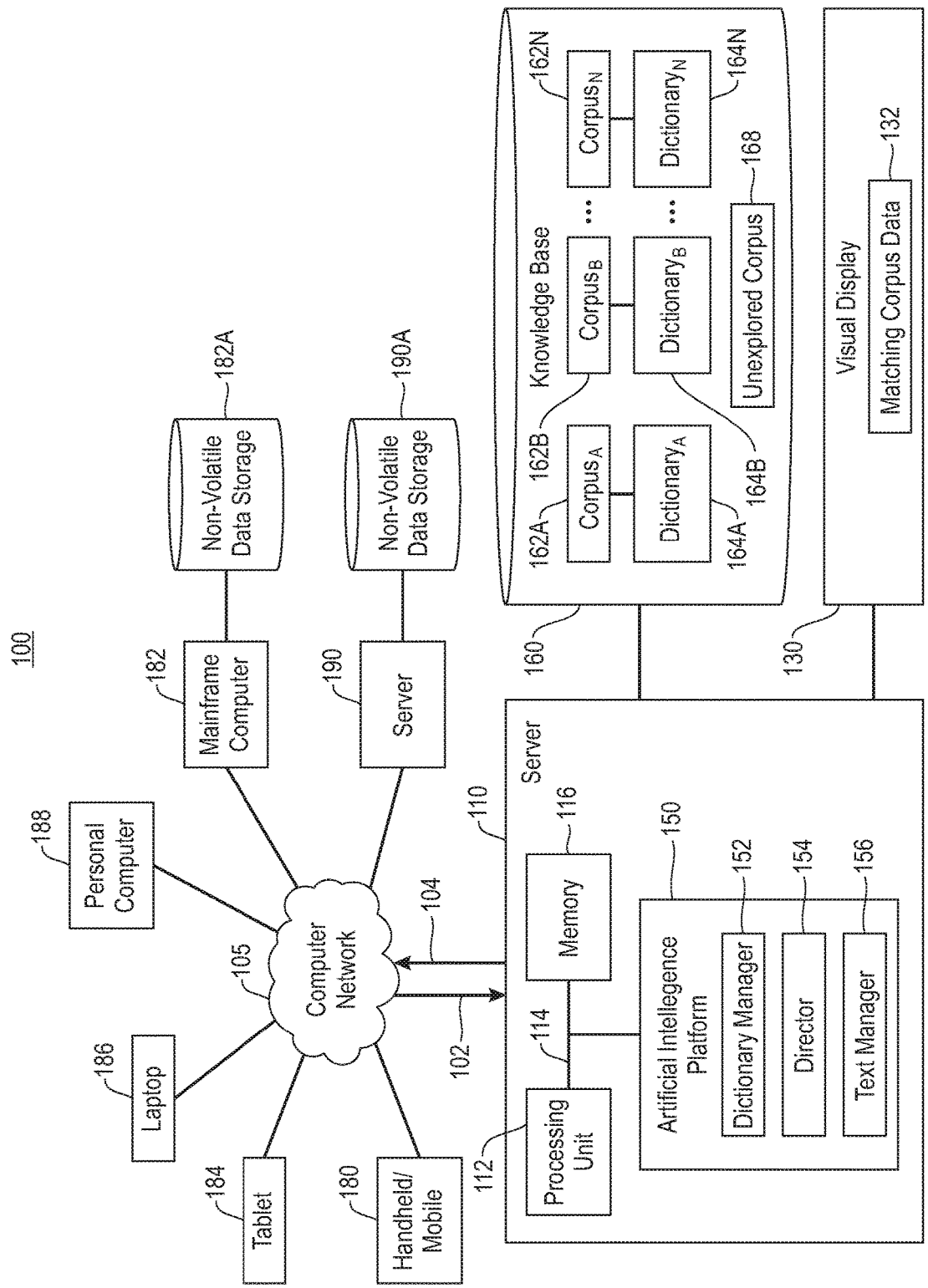
FIG. 1 depicts a system diagram illustrating a system connected in a network environment that supports dictionary membership management and iterative dictionary expansion.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificial intelligent systems, natural language processing systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Word vectors refer to a set of language modeling and feature learning techniques in natural language processing (NLP) where words or phrases from a vocabulary are mapped to vectors of real numbers. Words that share common context in a corpus are located or positioned in close proximity. It is understood in the art that word embedded algorithms are used to convert words to numerical vectors. One known algorithm is referred to as word2vec, which is a neural net based model that converts words into equivalent vector representations, thereby giving equal weight to all documents present in a corpus. The word2vec is trained on an unsupervised corpus of data irrespective of any given context or domain. In one embodiment, one or more alternative algorithms may be utilizes to numerically represent words, such as, but not limited to, recurrent neural networks (RNN) and long short-term memory (LSTM).

Dictionaries, ontologies, and linguistic resources, hereinafter collectively referred to as a dictionary, are the backbone of many natural language processing (NLP) and information retrieval systems. Entries in the dictionary are leveraged to identify and extract information, e.g. text, within an unstructured text within a corpus that is linguistically relevant to a corresponding query. However, construction and maintenance of the dictionary is challenging. Introduction of unnecessary errors into the dictionary may limit potential recall of the extraction. At the same time, a dictionary with a static set of terms may not be desirable in that the dictionary does not evolve, and as such, when applied to a text corpus may not properly recall and extract relevant text.

Referring to FIG. 1, a schematic diagram of a computer system (100) to support dictionary membership management and iterative dictionary expansion is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) with embedded tools to support and enable iterative expansion of the dictionary over the network (105) from one or more of the computing devices (180), (182), (184), (186), (188), and (190). The server (110) is shown herein operatively coupled to a knowledge base (160). Each of the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In addition, each of the computing devices (180)-(190) is operatively coupled to the knowledge base (160) across the network (105). Other embodiments of the server (110) may be used with components, systems, sub-systems, and/or devices other than those that are depicted herein.

The AI platform (150) is shown herein configured with tools to manage and facilitate application of cognitive computing to dictionary membership, and more specifically to support automated expansion of the dictionary. As shown, the knowledge base (160) is operatively coupled to the AI platform (150) and is configured with a plurality of text corpus, shown herein as $corpus_A$ ($162_A$), $corpus_B$ ($162_B$), and $corpus_N$ ($162_N$). Each of the corpus is shown with an operatively coupled dictionary, including $dictionary_A$ ($164_A$) operatively coupled to $corpus_A$ ($162_A$), $dictionary_B$ ($164_B$) operatively coupled to $corpus_B$ ($162_B$), and $dictionary_N$ ($164_N$) operatively coupled to $corpus_N$ ($162_N$). Although only three corpus are shown, the quantity should not be considered limiting. In one embodiment, the dictionaries ($164_A$), ($164_B$), and ($164_N$) are referred to as domain specific dictionaries, with each dictionary subject to expansion from an input text corpus. Each text corpus is shown with an operatively coupled dictionary. Each dictionary includes one or more text based terms, referred to herein as dictionary instances. As the dictionary is applied to a designated or assigned corpus by the tools of the AI platform (150), the dictionary instances are utilized to identify text within the corpus that is relevant. In one embodiment, the dictionary may be applied to more than one corpus. Accordingly, the AI platform (150), and more specifically the tools that comprise the AI platform (150), functions to manage dictionary membership.

The tools that comprises the AI platform (150), including a dictionary manager (152), a director (154), and a text manager (156) to manage dictionary expansion. The dictionary manager (152) functions to apply one or more dictionary instances against a text corpus. For example, as shown herein, the knowledge base (160) is populated with corpus and associated dictionaries. The dictionary manager (152) selects a dictionary and identifies the corresponding corpus, or in one embodiment a non-corresponding corpus, for dictionary expansion management. Each dictionary is populated with entries, referred to herein as dictionary instances or seed terms. As a preliminary step, the text manager (156) identifies, or in one embodiment builds, a neural language model of the text corpus that has been selected or identified. The dictionary manager (152) applies one or more of the dictionary instances against the selected or identified text corpus. Accordingly, the identified text corpus is represented as a neural language model and a dictionary and corresponding dictionary instances are identified for application to the text corpus.

As shown, the director (154) is operatively coupled to the dictionary manager (152), and functions to facilitate and enable an iterative expansion of the dictionary, and more specifically, an expansion of the instances that populate the dictionary. It is understood that the expansion of the dictionary includes the director (154) to selectively add additional dictionary instances to the dictionary, thereby augmenting the dictionary. The iterative expansion includes two algorithms, including a first algorithm to discover new instances from the text corpus and a second algorithm to generate new instances. As discussed herein, the dictionary expansion is iterative. In one embodiment, the director (154) executes the first algorithm followed by the second algorithm with each iteration, although this order of algorithm execution or application should not be considered limiting. Similarly, in one embodiment, a subject matter expert (SME) performs an adjudication of proposed candidate dictionary instances after each iteration. Accordingly, the director (154) manages the expansion of the dictionary with respect to the dictionary instances.

Figure 4:
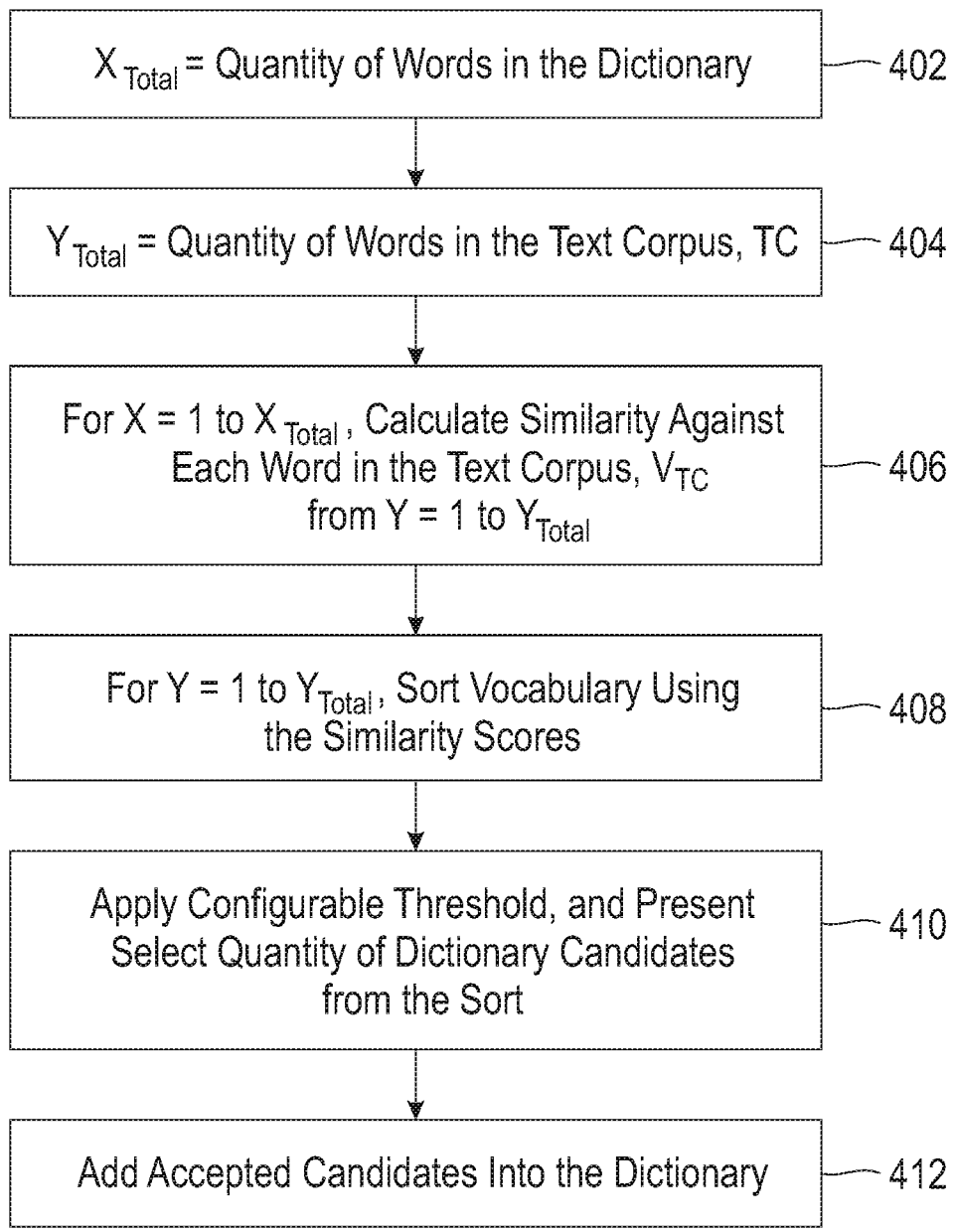
FIG. 4 depicts a flow chart illustrating a process for application of the first expansion algorithm.

The first algorithm, which is described in detail in FIG. 4, is executed by the director (154) and uses all the instances that currently populate the dictionary to identify similar terms in the corpus using the neural language model. Specifically, the first algorithm is directed at identification of semantically similar words in the text corpus to the instances that have already been populated into the dictionary. It is understood in the art that semantically similar words are words that have semantic similarity, but are not related. The director (154) represents each dictionary instance as a vector and calculates similarity between the dictionary instances in vector form to the instances in the corpus that are represented as a neural language model. In one embodiment, the similarity calculation includes the director (154) to use a cosine similarity measure for the assessment between the dictionary instances and the corpus instances. Accordingly, the director (154) uses the calculation, and in one embodiment, the similarity measurement, as a basis for selectively adding the identified related words as new instances to the dictionary.

Figure 5:
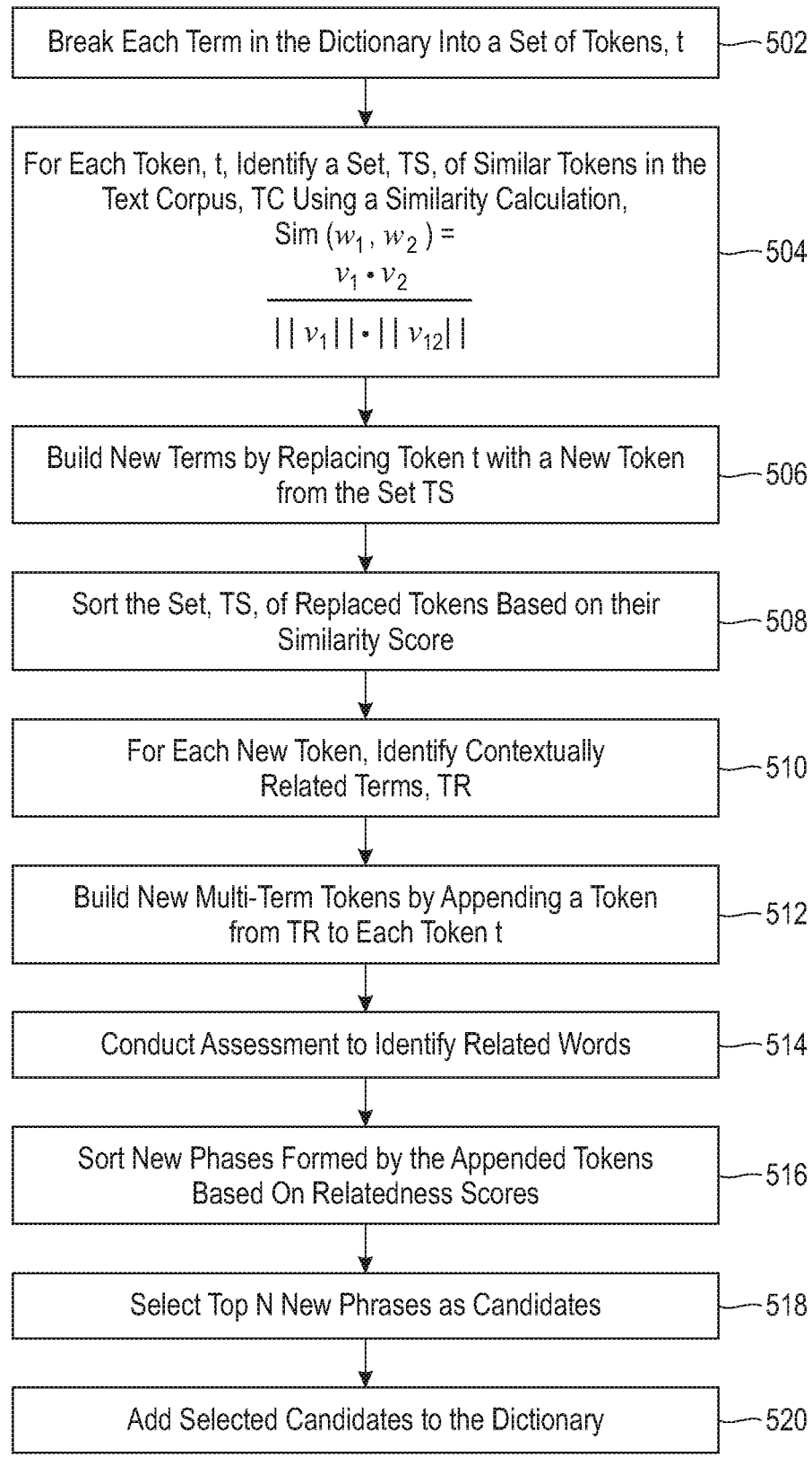
FIG. 5 depicts a flow chart illustrating a process for application of the second expansion algorithm.

The second algorithm, which is described in detail in FIG. 5, is executed by the director (154) to identify one or more extension instances associated with the text corpus that are contextually related to one or more of the instances that currently populate the dictionary, also referred to herein as an input dictionary. In one embodiment, the extension instances do not appear as instances within the text corpus, e.g. corpus vocabulary. The second algorithm identifies contextually related extension instances. Contextually related words are words that appear in the same context, e.g. "stomach" and "ache", but they are not semantically similar. In one embodiment, the director (154) generates new multi-token instances to augment the dictionary as new instances. The token is a term in the instance. For example, a compound instance may be comprised of two or more terms, each term referred to herein as a token. In one embodiment, the director (154) replaces tokens in an existing dictionary instance with similar tokens from the text corpus. Similarly, in one embodiment, the director (154) concatenates additional tokens to one or more existing dictionary instances with contextually related tokens from the text corpus. In each of these embodiments, the director (154) effectively creates contextually related instances, and similar to the first algorithm, the director (154) selectively adds the identified instances as new instances to the dictionary. Accordingly, through execution of the second algorithm, the director (154) selectively expands the dictionary beyond the instances present in the dictionary or the text corpus by analyzing the structure of the instances in the dictionary.

As shown herein, a text manager (156) is operatively coupled to the AI platform (150) and functions to facilitate application of the expanded dictionary. A usecase example of operation of the text manager (156) is shown and described in FIG. 6. The text manager (156) applies the expanded dictionary to an unexplored corpus. The instances that populate the expanded dictionary are utilized by the text manager (156) to identify matching data from the unexplored corpus to the populated dictionary instances. Accordingly, either after one iteration or multiple iterations, the dictionary in its expanded form is applied to a text corpus to identify data in the corpus that matches the instances that populated the dictionary.

The first and second algorithms are applied by the director (154) through one or more iterations to expand the population of instances within the dictionary. In one embodiment, the dictionary expansion employs human interaction, e.g. human in the loop (HumL), to supervise or assist in building and maintaining the dictionary through the expansion process. The HumL controls semantic drift at every iteration cycle. In one embodiment, the iterative expansion of the dictionary may include a frequency for HumL application or intervention. Accordingly, the dictionary expansion supports HumL at select iterative cycles to manage expansion of the domain-specific dictionary.

The various computing devices (180), (182), (184), (186), (188), and (190) in communication with the network (105) may include access points for the text corpus, shown herein as $corpus_A$ ($162_A$), corpus ($162_B$), and $corpus_N$ ($162_N$) of the knowledge base (160) and the corresponding domain-specific dictionaries, shown herein as dictionaries ($164_A$), ($164_B$), and ($164_N$). The AI platform (150) functions to manage iterative expansion of the domain-specific dictionaries, and applications of one or more iteratively expanded dictionaries to an unexplored or selected corpus. Application of the domain-specific dictionary is managed by the text manager (156) and identifies matching corpus data (132), also referred to herein as output data. In one embodiment, the AI platform (150) communicates the matching corpus data (132) to a visual display (130), shown herein operatively coupled to the server (110) or one or more of the computing devices (180)-(190) across network connection (104).

The network (105) may include local network connections and remote connections in various embodiments, such that the AI platform (150) may operate in environments of any size, including local and global, e.g. the Internet. The AI platform (150) serves as a front-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, one or more of the corpus, e.g. $corpus_A$ ($162_A$), corpus ($162_B$), and $corpus_N$ ($162_N$) of the knowledge base (160), may be in the form of one or more logically grouped documents or files. The knowledge base (160) may include structured and unstructured documents, including but not limited to any file, text, article, or source of data (e.g. scholarly articles, dictionary, definitions, encyclopedia references, and the like) for use by the AI platform (150). Content users may access the AI platform (150) via a network connection or an internet connection to the network (105). The director (154) submits or manages submission of a domain-specific dictionary to an appropriately classified corpus for dictionary expansion, and the text manager (156) manages application of the domain-specific dictionary to an unexplored corpus, or in one embodiment, a different corpus than that employed for the dictionary expansion. The text manager (156) effectively determines an output response by searching content in the unexplored corpus operatively coupled to the knowledge base (160) or any electronic data source operatively coupled to the server (110) across the network (105).

The AI platform (150) is shown herein with several tools to support dictionary expansion and application. The tools, including the dictionary manager (152), the director (154), and the text manager (156), either individually or collectively function as either a software tool or a hardware tool.

In some illustrative embodiments, server (110) may be the IBM Watson® system available from International Business Machines Corporation of Armonk, N.Y., which is augmented with the mechanisms of the illustrative embodiments described hereafter. The IBM Watson® system may support the tools (152)-(156) to support the iterative expansion of one or more domain-specific dictionaries, and application of the expanded dictionaries. Matching corpus data (132) is identified by applying the expanded dictionary to a select corpus, such as an unexplored corpus (168), and looking for portions of the unexplored corpus (168) that have some potential for containing a response matching content characteristic(s) of the instances that populate the applied dictionary. The response output (132) is directed at specific content. For example, the response output (132) may be in the form of a link to a source for the response content. Similarly, in one embodiment, the response output (132) may include both content and the source link. Accordingly, the content of the response may come in different forms, or a combination of forms.

The dictionary manager (152), director (154), and text manager (156), collectively referred to as AI tools, are shown as being embodied in or integrated within the AI platform (150) of the server (110). The AI tools may be implemented in a separate computing system (e.g., 190) that is connected across network (105) to the server (110). Wherever embodied, the AI tools function to evaluate and iteratively expand the instances that populate one or more domain-specific dictionaries, apply the expanded dictionary to an unexplored corpus (168), and identify and communicate response content (132).

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

The information handling system employed to support the AI platform (150) may take many forms, some of which are shown in FIG. 1. For example, AI platform may take the form of a desktop, server, portable, laptop, notebook, or other form factor computer or data processing system. In addition, the information handling system to support the AI platform (150) may take other form factors such as a personal digital assistant (PDA), a gaming device, ATM machine, a portable telephone device, a communication device or other devices that include a processor and memory. In addition, the information handling system need not necessarily embody the north bridge/south bridge controller architecture, as it will be appreciated that other architectures may also be employed.

Figure 2:
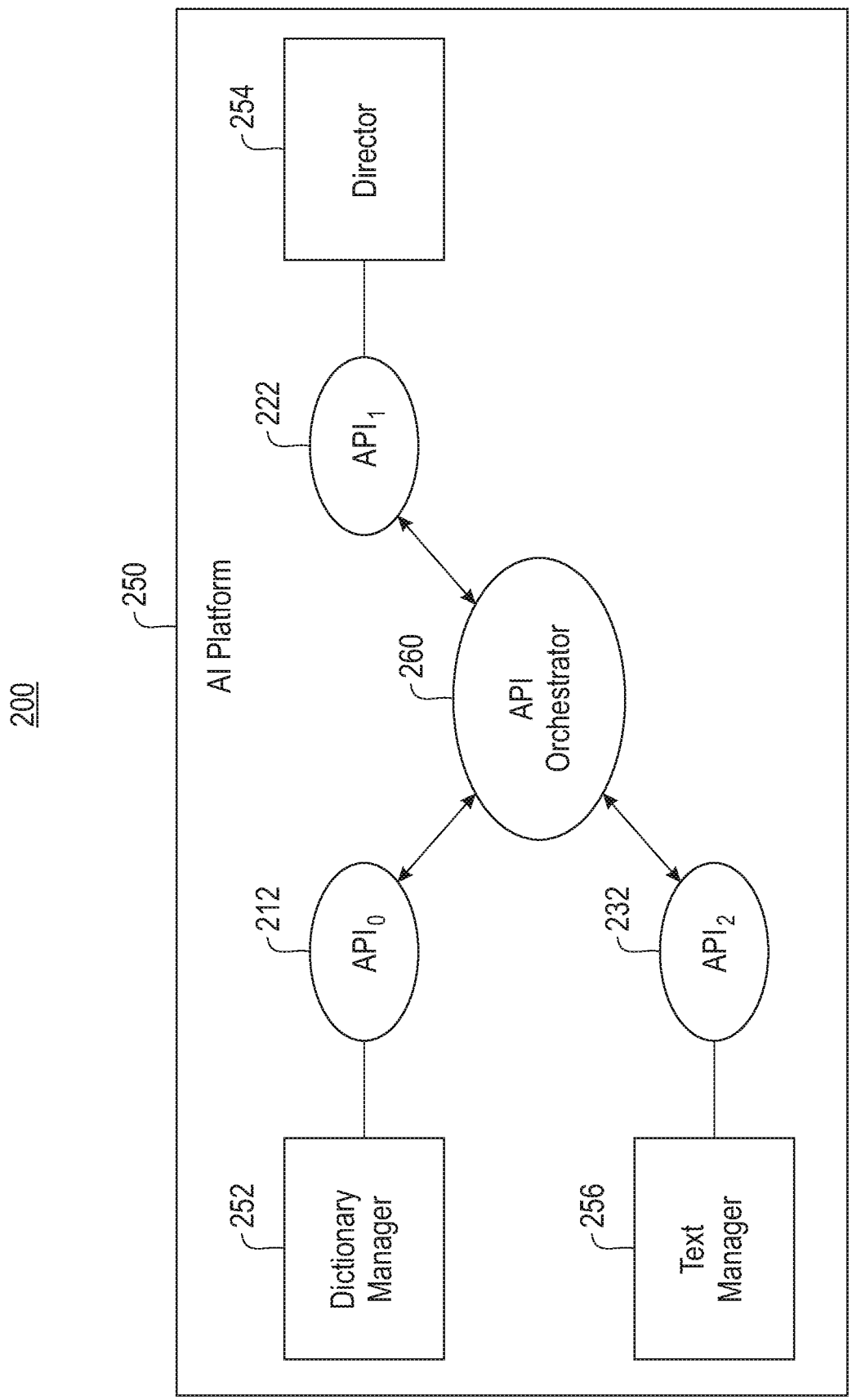
FIG. 2 depicts a block diagram illustrating the AI platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 2, a block diagram (200) is provided illustrating the tools (152)-(156) and their associated APIs. As shown, a plurality of tools are embedded within the AI platform (250), with the tools including the dictionary manager (252) associated with $API_0$ (212), the director (254) associated with $API_1$ (222), and the text manager (256) associated with $API_2$ (232). Each of the APIs may be implemented in one or more languages and interface specifications. $API_0$ (212) provides functional support to apply one or more dictionary instances against a text corpus; $API_1$ (222) provides functional support to iteratively expand one or more domain-specific dictionaries, and specifically the instances that populate the dictionaries; and $API_2$ (232) provides functional support to apply the iteratively expanded dictionary against an unexplored corpus and to identify content matching the dictionary instances. As shown, each of the APIs (212), (222), and (232) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
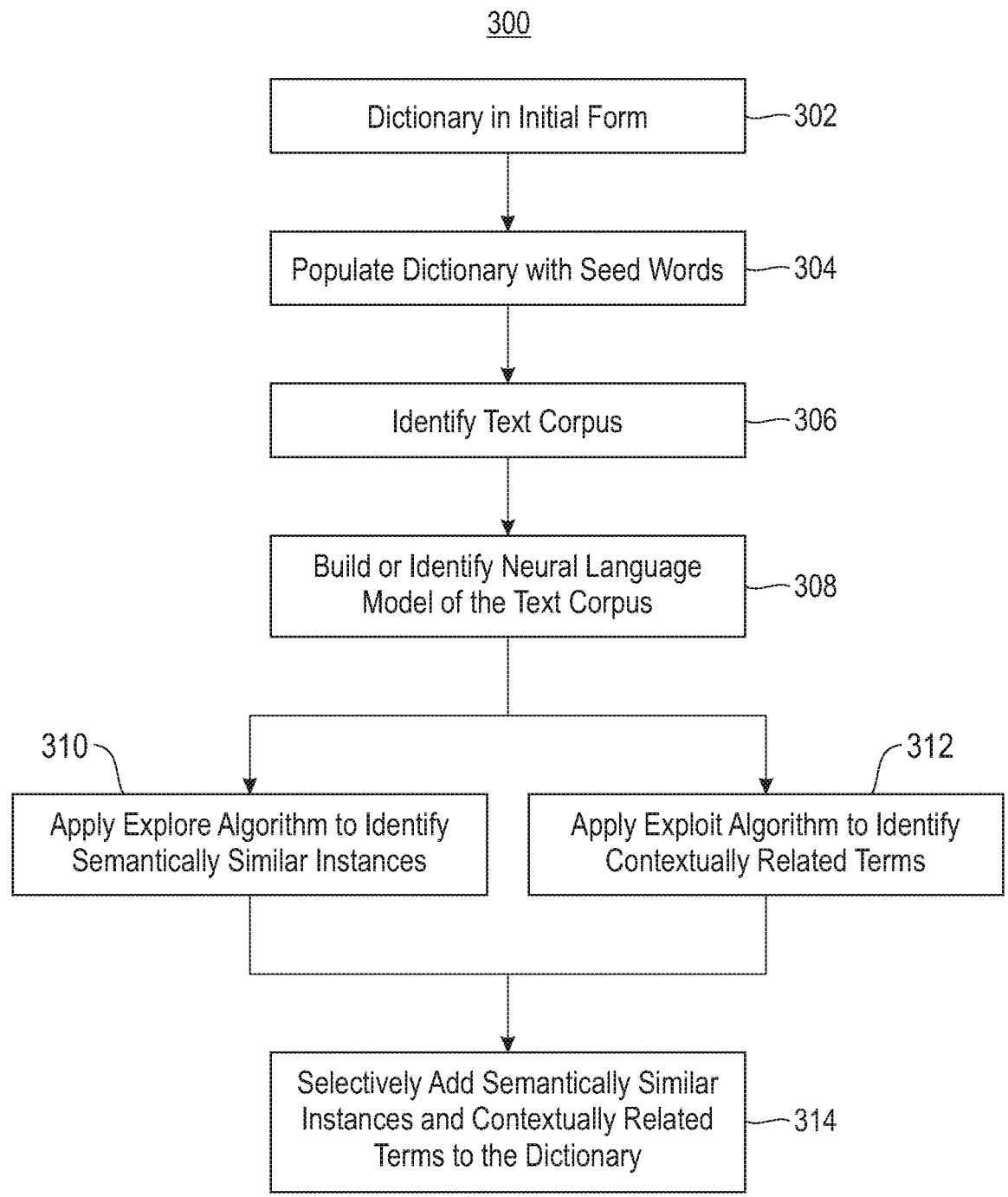
FIG. 3 depicts a flow chart illustrating a process for dictionary expansion directed at semantically similar words and contextually related terms.

Referring to FIG. 3, a flow chart (300) is provided to illustrate dictionary expansion directed at semantically similar words and contextually related terms. In one embodiment, the dictionary expansion shown herein is directed at the first algorithm, as shown and described in FIG. 1. As shown, a dictionary in its initial form and content is provided (302). The dictionary is populated with one or more initial seed words (304), which form the basis and foundation for the composition of the dictionary. The dictionary is configured to be applied to a text corpus to identify semantically similar words and contextually related terms. Prior to application, the text corpus that is the subject of the dictionary application is identified (306), and a neural language model of the text corpus is either identified or built (308). Using the neural language model, all the words in the text corpus are converted into a numerical vector representation. Two algorithms are applied to the dictionary for expansion. As shown, a first algorithm, referred to herein as an explore algorithm, identifies semantically similar instances in the text corpus to the dictionary seeds words (310). Details of the explore algorithm are shown and described in FIG. 4. In addition, a second algorithm, referred to herein as an exploit algorithm, identifies contextually related terms in the text corpus to the dictionary seeds words (312). Details of the exploit algorithm are shown and described in FIG. 5. Although the two algorithms at steps (310) and (312) are shown in parallel, in one embodiment, they may be sequentially aligned. For example, in one embodiment, the algorithm at step (310) may be an initially algorithm, and the algorithm at step (312) may be a subsequent algorithm. The semantically similar instances identified at step (310) and the identified contextually related terms identified at step (312) are selectively added to the dictionary (314). Following step (314) the process may proceed with additional iterations of the explore and exploit algorithms, as demonstrated at steps (312) and (314). The process of selectively populating the dictionary through these algorithms stops when there are no more candidates to be discovered.

The explore algorithm shown in FIG. 3 discovers new instances from the text corpus. More specifically, the explore algorithm uses all the terms currently in the dictionary to identify similar terms in the corpus using the neural language model. A neural net based model, such as word2vec, RNN, LSTM, etc., converts words into equivalent vector representation. The neural net model is a computationally efficient multi-layer neural network model for learning term embeddings from raw text. Output of the model is an embedding matrix, W, where each terms, either single token or multi-token, from the text corpus vocabulary, $V_{TC}$, is represented as an n-dimensional vector. When projecting these latent representations of words into a lower dimensional feature space, words which are semantically similar appear closer to each other. Therefore, calculating similarity between two terms is a matter of calculating the distance between two instances in the given feature space.

Referring to FIG. 4, a flow chart (400) is provided to illustrate details of the explore algorithm. In one embodiment, the dictionary expansion shown herein is directed at the first algorithm, as shown and described in FIG. 1. The variable $X_{Total}$ is assigned to represent the quantity of words in the dictionary (402), and the variable $Y_{Total}$ is assigned to represent the quantity of words in the text corpus, TC, (404). For each word X in the dictionary, a similarity is calculated against all the words in the text corpus, $V_{TC}$, (406). The following formula represents the similarity calculation:

$$sim(w_1, w_2) = \frac{V_1 \cdot V_2}{\|V_1\| \cdot \|V_{12}\|}$$

where $w_1$ and $w_2$ are two terms and sim is the calculation of the similarity between terms $w_1$ and $w_2$. The similarity calculation shown herein is a cosine similarity measure applied on the vectors of the instances. Formally, the similarity between any two terms, represented herein as $w_1$ with vector $V_1$ and $w_2$ with vector $V_2$ is calculated as the cosine similarity between the vectors $V_1$ and $V_2$. Accordingly, the similarity between the instances in the input dictionary and all the words in the corpus vocabulary, $V_{TC}$, is calculated.

Following step (406), the vocabulary is sorted using the similarity scores (408). In one embodiment, the vocabulary is sorted in descending order using the cumulative similarity score. A select quantity of dictionary candidates from the sort is presented (410) and added into the dictionary (412). In one embodiment, the quantity of candidates for presentation is a configurable value. Accordingly, a similarity assessment is conducted through the explore algorithm to add words to the dictionary.

The exploit algorithm introduced in FIG. 3 uses all terms in the dictionary and the neural language model to construct more complex terms that might be of interest. More specifically, the exploit algorithm identifies more complex terms that do not appear in the corpus vocabulary, by analyzing the structure of the instances in the dictionary, also referred to herein as the input dictionary. Referring to FIG. 5, a flow chart (500) is provided to illustrate details of the exploit algorithm. Each term, e.g. instance, in the dictionary is broken into a set of single tokens (502). For example, the term T is broken down into a set of tokens $\{t_1, t_2, \ldots t_n\}$. For each token, t, a set of similar tokens, $TS_{ti}$ $\{ts_1, ts_2, \ldots ts_n\}$, are identified in the vocabulary $V_{TC}$ using the similarity calculation (504):

$$sim(w_1, w_2) = \frac{V_1 \cdot V_2}{\|V_1\| \cdot \|V_{12}\|}$$

New terms are then built by replacing the tokens $t_i$ with a token $t_s$ from $TS_{ti}$ (506). The new terms, e.g. replaced tokens, are subject to a sort algorithm based on their corresponding similarity score (508). In one embodiment, a configurable value N is employed for limiting the selection of the new terms. For each new token, $t_i$, a set of contextually related words or related terms $TR_{ti}=\{tr_1, tr_2, \ldots tr_r\}$ are identified (510), where relatedness with respect to content, s(tr) is based on the probability of two terms appearing together, e.g. $s(t_r)=P(t_r|t_i)$. Related tokens are tokens that often share the same context, which means they often are surrounded by similar words. At step (510) and using a neural net based model, such as word2vec, relatedness between two terms, $w_1$ and $w_2$, is calculated using the following formula:

$$p(w_1|w_2) = \frac{\exp(v'^T_{w1} v_{w2})}{\sum_{w=1}^{V} \exp(v'^T_w v_{w2})}$$

where $v_w$ and $v'_w$ are the input and the output vectors of the word w, respectively, and V is the complete vocabulary of words.

Using the output from the relatedness assessed at step (510), new multi-term tokens are built by appending a token $t_r$ from $TR_{ti}$ to each token $t_i$ from T (512). An assessment is conducted to identify the related words (514), using the following formula:

$$P(t_{r1}, t_{r2}|t_{r1}) = (P(t_{r1}|t_i)) \cdot (P(t_{r2}|t_i, t_{r2}))$$

effectively assessing relatedness of the words. Following step (514), the new phrases formed by the appended tokens are sorted based on the relatedness scores (516). The top N new phrases are selected as candidates (518), where N is a configurable value, and added to the dictionary (520). Accordingly, new related phrases are created and selectively added to the dictionary.

Figure 6:
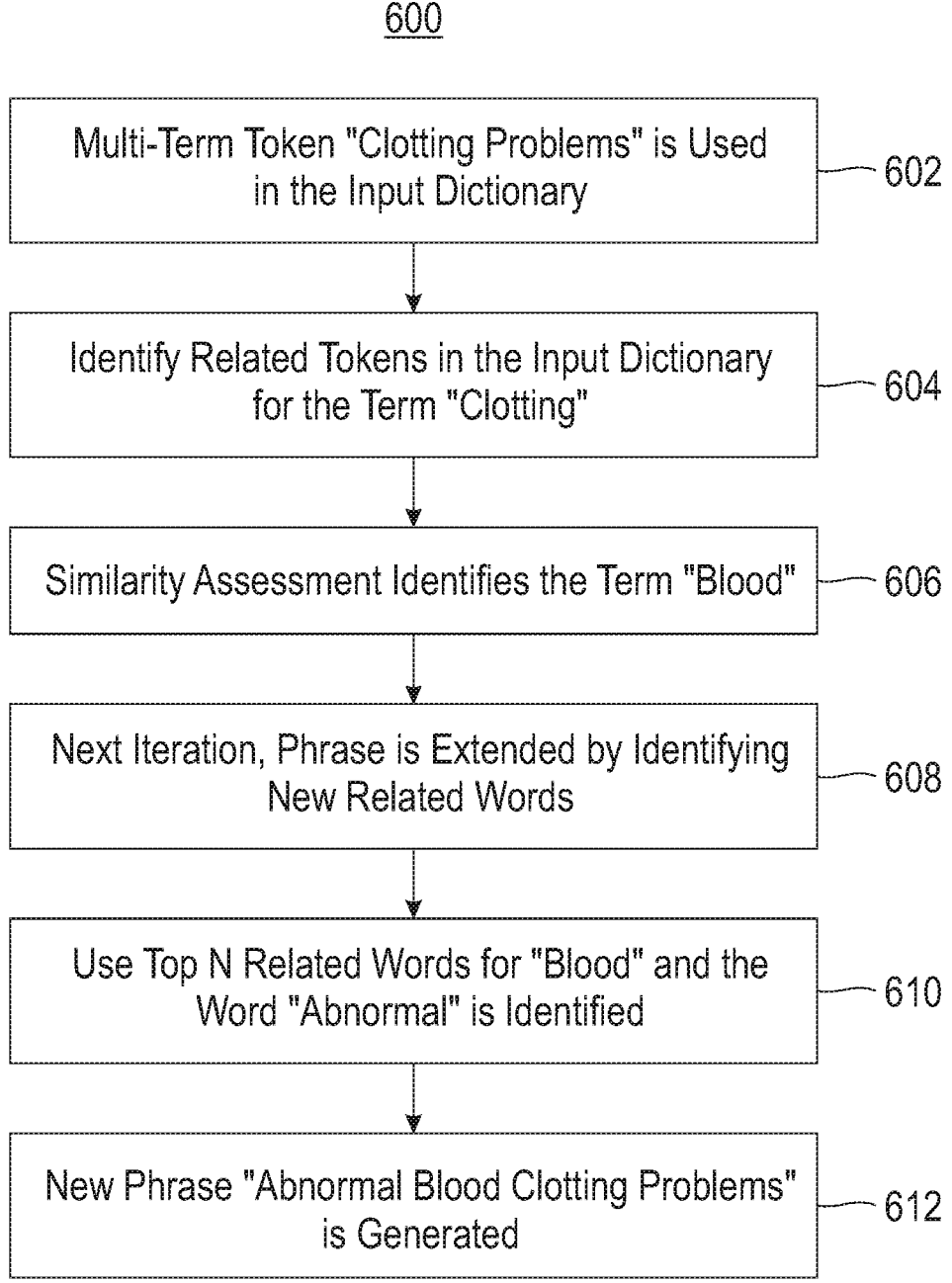
FIG. 6 depicts a flow chart illustrating a usecase example of the algorithm shown and described in FIG. 5 to identify and create new related phrases for the dictionary.

Referring to FIG. 6, a flow chart (600) is provided to illustrate a usecase example of the algorithm shown and described in FIG. 5 to identify and create new related phrases for the dictionary. Using the multi-token term "clotting problems" in the input dictionary (602), e.g. TC, and the algorithm shown and described in FIG. 5, related tokens are identified in the input dictionary for the term "clotting" (604). The similarity assessment for related words produces or otherwise identifies the term "blood" (606), because in many sentences "blood clotting" appears as a phrase, which can be used to generate new instances "blood clotting problems". In the next iteration, the phrase is further extended by identifying new related words (608). Using the top N related words for "blood", the word "abnormal" is identified (610), which is used to generate the phrase "abnormal blood clotting problems" (612). Accordingly, as shown in this usecase, new similar dictionary entries are discovered to generate new multi-word phrases.

It is understood in the art that dictionary membership associated with expansion is a subjective task. The dictionary expansion shown and described in FIGS. 1-6, supports interaction of a human-in-the loop (HumL) to control direction of the dictionary expansion, such as accepting or rejecting candidate entries, also referred to herein as selectively expanding the dictionary membership. In one embodiment, the HumL controls semantic drift at one or more iteration cycles. Once the dictionary has a sufficient number of entries, the dictionary expansion is complete.

In a technical scenario, the expanded dictionary may be applied against an unexplored corpus to identify contextually related data. For example, in the venue of medical and health care, medical reports need to be scanned for clinical issues, e.g. adverse medication reactions which might be caused by prescription medication(s). It is understood that new medications are periodically approved and available. Existing lexicons of adverse reactions need to be updated. Accordingly, the dictionary expansion may be applied to medical and health care venues to identify relationships between existing medications, new medications, and adverse reactions.

The dictionary expansion may be applied to natural language processing (NLP). It is understood that conversational agents leverage an existing dictionary to facilitate responding to inquiries. However, existing dictionaries do not capture or reflect the breadth of the natural language that can be used for a particular concept. In one embodiment, such as booking travel, the dictionary expansion may be extended to support clustering as a form of paraphrasing a specific section, such as greetings and conversation conclusion terms, and mapping the clusters into a tree structure that captures the order of the paraphrased sections. The tree structure is then leveraged to diversify system responses, as well as identify questions that were previously not interpretable, and recommend possible replies to a corresponding inquiry.

With respect to industry and manufacturing, it is understood that vehicles, such as land and air vehicles, are constructed from a plurality of functional parts, including mechanical and electrical parts. These parts are subject to wear, and may require replacement. The technology of these vehicles is changing from combustion engine to hybrid or full-electric vehicles and from pressurized air in the tires to nitrogen-filled tires. The dictionary expansion can be applied to the vehicle industry to capture and track new technical terms as the technology evolves, which can then be applied to identify textually related data to the evolving vehicle technology.

It is understood that electronic commerce is continuing to expand. Consumers have a plurality of online venues available to purchase products. New products often include new and unseen attributes to describe product characteristics. To support browsing and recommendations of such new products, the venues must be able to efficiently categorize the new products and identify the new product attributes. The dictionary expansion supports and enables identification of new product attributes as well as maintenance of a lexicon of product attributes. The dictionary expansion captures and tracks new product attributes, which can then be applied to identify related products and related product data.

Aspects of the dictionary expansion and application as shown in FIG. 3-6, employs one or more functional tools, as shown and described in FIG. 1. Aspects of the functional tools (152)-(156) and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the processes described above with respect to FIGS. 3-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
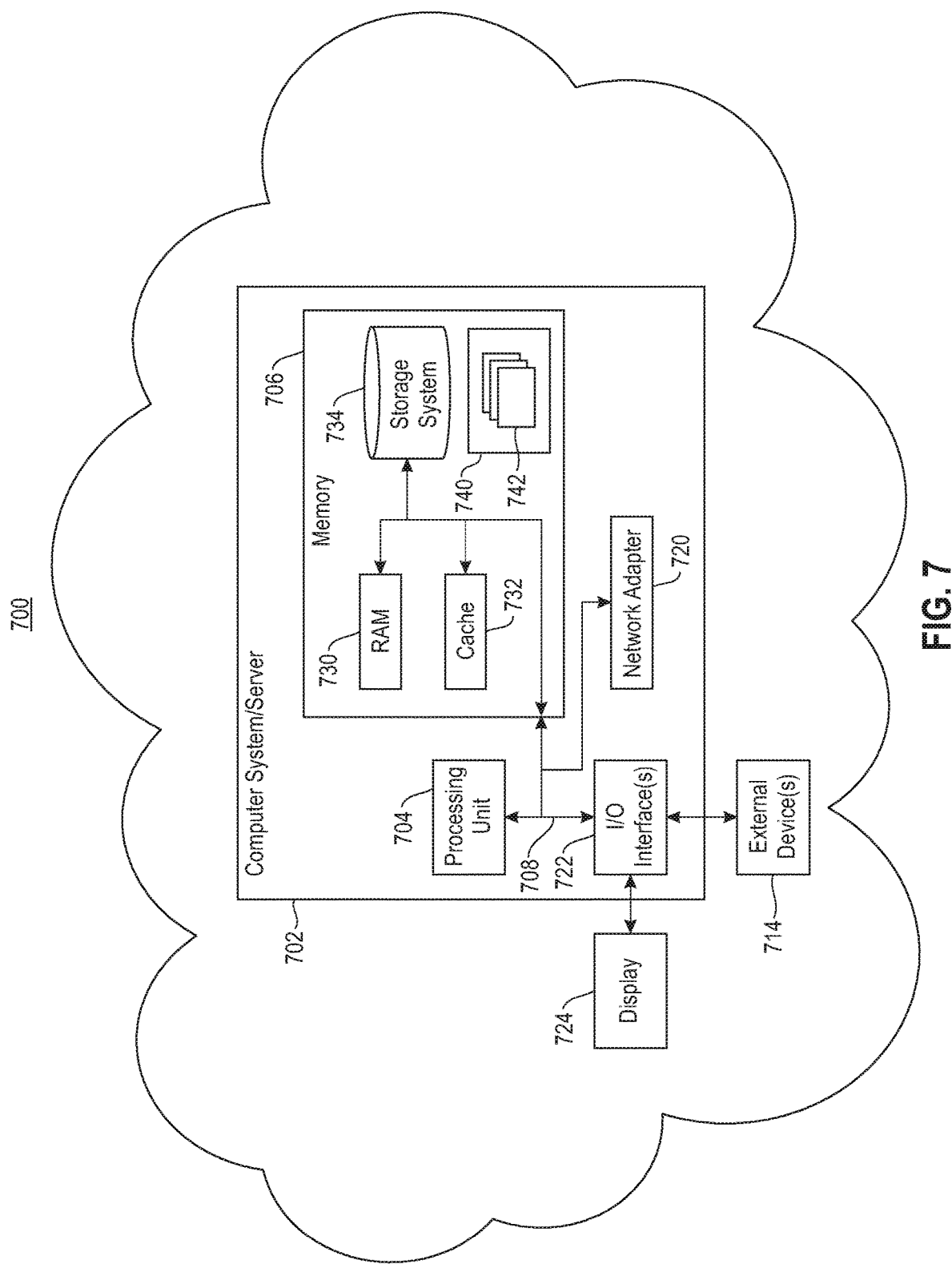
FIG. 7 depicts a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to iteratively expand one or more domain-specific dictionaries, and apply the expanded dictionary to an unexplored corpus to identify matching data within the corpus to the instances of the dictionary. For example, the set of program modules (742) may include the tools (152)-(156) as described in FIG. 1.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
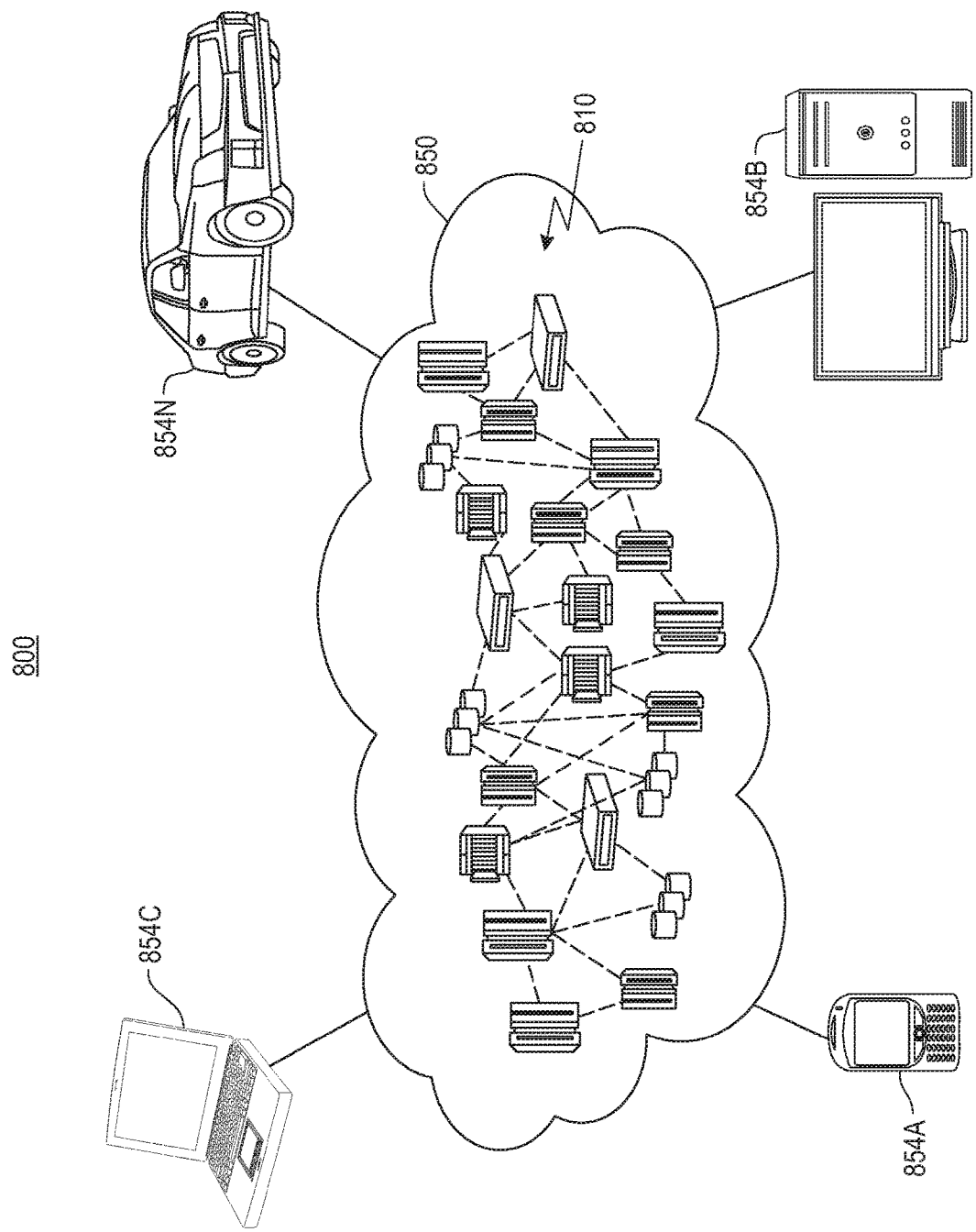
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
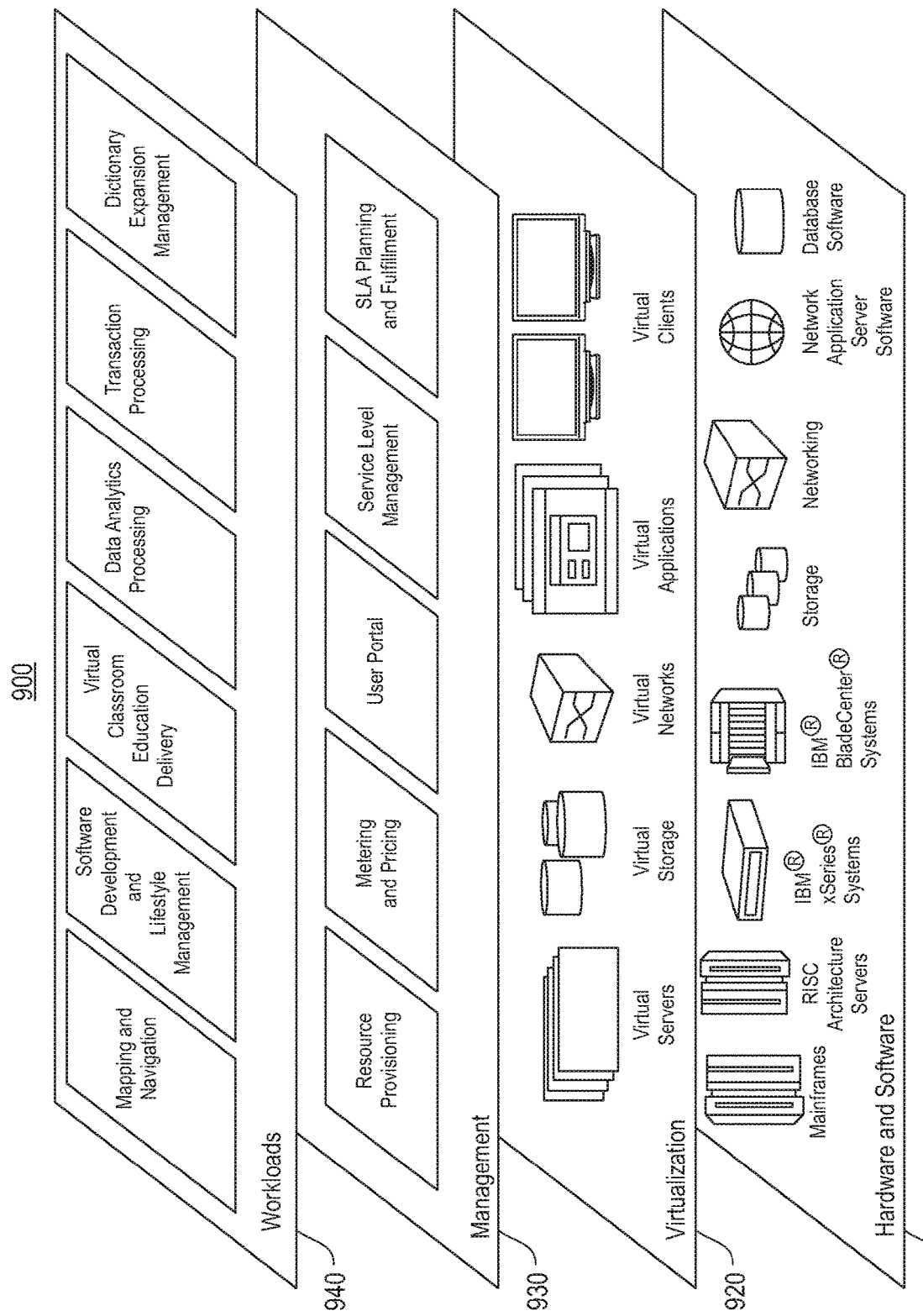
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dictionary expansion management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to expand the dictionary and apply the expanded dictionary and dictionary instances to identify matching corpus data.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the data storage and/or corpus may be localized, remote, or spread across multiple systems. Accordingly, the scope of protection of the embodiments is limited only by the following claims and their equivalents.

What is claimed is:

1. A computer system comprising:
   a processing unit operatively coupled to memory;
   an artificial intelligence (AI) platform in communication with the processing unit, the AI platform to manage dictionary expansion, including:
      a dictionary manager configured to apply one or more dictionary instances against a text corpus;
      a director operatively coupled to the dictionary manager, the director configured to iteratively expand a dictionary, the expansion comprising:
         identification of one or more semantically similar instances to one or more first applied dictionary instances, and selective addition of the identified one or more semantically similar instances to the dictionary; and
         extension of one or more second applied dictionary instances, including identification of one or more extension instances contextually related to the one or more second applied dictionary instances, generation of one or more multi-token phrases comprising the one or more second applied dictionary instances concatenated with the contextually related one or more extension instances, and selective addition of the one or more multi-token phrases to the dictionary; and
      a text manager operatively coupled to the AI platform, the text manager to apply the iteratively expanded dictionary to an unexplored corpus to identify matching corpus data to populated instances of the dictionary.

2. The computer system of claim 1, further comprising the text corpus represented as a neural language model, and wherein the identification of one or more semantically similar instances further comprises the director configured to represent the one or more dictionary instances as a vector and calculate similarity between the one or more dictionary instances in vector form and all instances in the text corpus.

3. The computer system of claim 2, wherein the similarity calculation includes the director to use a cosine similarity measure.

4. The computer system of claim 1, wherein the selective addition of the identified one or more contextually related extension instances to the dictionary includes the director configured to expand the dictionary beyond terms present in the text corpus.

5. The computer system of claim 4, wherein the director is configured to replace tokens in an existing dictionary instance with similar tokens from the text corpus.

6. The computer system of claim 1, wherein the one or more multi-token phrases comprise a first token and a second token, wherein the first and second tokens are not semantically similar to one another.

7. A computer program product for dictionary expansion management, the computer program product comprising:
   a computer readable storage medium; and
   program code embodied with the computer readable storage medium, the program code executable by a processor to:
      apply one or more dictionary instances against a text corpus;
      iteratively expand a dictionary, comprising:
         identify one or more semantically similar instances to one or more first applied dictionary instances, and selectively add the identified one or more semantically similar instances to the dictionary; and
         extend one or more second applied dictionary instances, including identify one or more extension instances contextually related to the one or more second applied dictionary instances, generate one or more multi-token phrases comprising the one or more second applied dictionary instances concatenated with the contextually related one or more extension instances, and selectively add the one or more multi-token phrases to the dictionary; and
      apply the iteratively expanded dictionary to an unexplored corpus to identify matching corpus data to populated instances of the dictionary.

8. The computer program product of claim 7, further comprising the text corpus represented as a neural language model, and the program code to identify one or more semantically similar instances further comprises program code executable by the processor to represent the one or more dictionary instances as a vector and calculate similarity between the one or more dictionary instances in vector form and all instances in the text corpus.

9. The computer program product of claim 8, wherein the similarity calculation includes the program code using a cosine similarity measure.

10. The computer program product of claim 7, wherein the program code to selectively add the identified one or more contextually related extension instances to the dictionary includes program code executable by the processor to expand the dictionary beyond terms present in the text corpus.

11. The computer program product of claim 10, wherein expansion of the dictionary further comprises program code executable by the processor to replace tokens in an existing dictionary instance with similar tokens from the text corpus.

12. The computer program product of claim 7, wherein the one or more multi-token phrases comprise a first token and a second token, wherein the first and second tokens are not semantically similar to one another.

13. A method comprising:
   applying one or more dictionary instances against a text corpus;
   iteratively expanding a dictionary, comprising:
      identifying one or more semantically similar instances to the one or more first applied dictionary instances, and selectively adding the identified one or more semantically similar instances to the dictionary; and
      extending of one or more second applied dictionary instances, including identifying one or more extension instances contextually related to the one or more second applied dictionary instances, generating one or more multi-token phrases comprising the one or more second applied dictionary instances concatenated with the contextually related one or more extension instances, and selectively adding the one or more multi-token phrases to the dictionary; and applying the iteratively expanded dictionary to an unexplored corpus to identify matching corpus data to populated instances of the dictionary.

14. The method of claim 13, further comprising the text corpus represented as a neural language model, and wherein identifying one or more semantically similar instances further comprises representing the one or more dictionary instances as a vector and calculating similarity between the one or more dictionary instances in vector form and all instances in the text corpus.

15. The method of claim 13, wherein selectively adding the identified one or more contextually related extension instances to the dictionary includes expanding the dictionary beyond terms present in the text corpus.

16. The method of claim 15, wherein expanding the dictionary further comprises replacing tokens in an existing dictionary instance with similar tokens from the text corpus.

17. The method of claim 13, wherein the one or more multi-token phrases comprise a first token and a second token, wherein the first and second tokens are not semantically similar to one another.

* * * * *